US012771232B2

(12) United States Patent
Ahmed

(10) Patent No.: US 12,771,232 B2
(45) Date of Patent: Oct. 20, 2026

(54) HIGH VOLTAGE SWITCH DESIGN IN A LOW VOLTAGE PROCESS NODE WITH SMALL QUIESCENT CURRENT

(71) Applicant: QUALCOMM Incorporated, San Diego, CA (US)

(72) Inventor: Shamim Ahmed, Mesa, AZ (US)

(73) Assignee: QUALCOMM Incorproated, San Diego, CA (US)

( * ) Notice: Subject to any disclaimer, the term of this patent is extended or adjusted under 35 U.S.C. 154(b) by 11 days.

(21) Appl. No.: 19/014,035

(22) Filed: Jan. 8, 2025

(65) Prior Publication Data

US 2026/0196922 A1 Jul. 9, 2026

(51) Int. Cl.
*H02M 1/08* (2006.01)
*H02M 1/00* (2006.01)
*H02M 3/156* (2006.01)

(52) U.S. Cl.
CPC ......... *H02M 1/083* (2013.01); *H02M 1/0045* (2021.05); *H02M 3/156* (2013.01)

(58) Field of Classification Search
CPC ..... H02M 1/083; H02M 1/0045; H02M 3/156
See application file for complete search history.

(56) References Cited

U.S. PATENT DOCUMENTS

| | | | | |
|---|---|---|---|---|
| 4,511,195 | A * | 4/1985 | Barter | H05B 41/40 315/307 |
| 10,895,884 | B2 | 1/2021 | Kotrc et al. | |
| 11,567,557 | B2 | 1/2023 | Gada et al. | |
| 2008/0067995 | A1* | 3/2008 | Chua-Eoan | H02M 3/158 323/284 |
| 2018/0152019 | A1* | 5/2018 | Mysore Rajagopal | H02H 9/046 |
| 2021/0384832 | A1* | 12/2021 | Jiang | H02M 3/156 |

OTHER PUBLICATIONS

International Search Report and Written Opinion—PCT/US2025/052942—ISA/EPO—Feb. 24, 2026.

Stanescu C., et al., "Soft-Start low voltage CMOS LDO", CAS 2013 (International Semiconductor Conference), IEEE, vol. 2, Oct. 14, 2013, pp. 185-188, XP032531319.

* cited by examiner

*Primary Examiner* — Sibin Chen
(74) *Attorney, Agent, or Firm* — Seyfarth Shaw LLP

(57) ABSTRACT

A system-on-chip (SoC) is described. The SoC includes an interface physical input/output (IO) module (PHY) on a substrate. The interface PHY includes a high voltage power rail and a low voltage power rail. The SoC also includes a voltage regulator on the substrate and configured to supply to a low voltage to the low voltage power rail. The SoC further includes a high voltage switch on the substrate and coupled to the high voltage power rail of the interface PHY and the voltage regulator. The high voltage switch to maintain a quiescent current in the interface PHY below an activation current level.

18 Claims, 8 Drawing Sheets

HIGH VOLTAGE SWITCH DESIGN IN A LOW VOLTAGE PROCESS NODE WITH SMALL QUIESCENT CURRENT

BACKGROUND

Field of the Disclosure

Aspects of the present disclosure relate to clock monitoring units of integrated circuits (ICs) and more specifically to a high voltage switch design in a low voltage process node with small quiescent current.

Background

Stringent electrical operational specifications help address system redundancy, provide greater resistance to electrical and software faults, and improve system monitoring. One sub-component of such systems that is of interest is a high voltage switch that produces voltages, also commonly referred to as an operating voltage (VOP) to drive various input/output (IO) sub-systems of a system-on-chip (SoC). Sometimes the high voltage devices are available but at a higher process cost. For example, an SoC may include transistor devices configured to operate at a master input voltage (e.g., 3.3 volts (V)).

Currently, process nodes continue a downward size minimization resulting in low voltage process nodes. Unfortunately, transistor devices for implementing a high voltage switch that is configured to operate at a master input voltage (e.g., 3.3 V) are unavailable at the low voltage process nodes. A high voltage switch design in a low voltage process node with a small quiescent current is desired.

SUMMARY

A system-on-chip (SoC) is described. The SoC includes an interface physical input/output (IO) module (PHY) on a substrate. The interface PHY includes a high voltage power rail and a low voltage power rail. The SoC also includes a voltage regulator on the substrate and configured to supply to a low voltage to the low voltage power rail. The SoC further includes a high voltage switch on the substrate and coupled to the high voltage power rail of the interface PHY and the voltage regulator. The high voltage switch to maintain a quiescent current in the interface PHY below an activation current level.

A method to perform a power up sequence is described. The method includes receiving a master input voltage at an input of a high voltage switch coupled to a high voltage power rail of an input/output (IO) interface. The method also includes supplying, by a voltage regulator, a low output voltage to a low voltage power rail of the IO interface. The method further includes maintaining a quiescent current in the IO interface at a level below an activation current level when the master input voltage is applied to the high voltage switch. The method also includes directly supplying, using the high voltage switch, the master input voltage to the high voltage power rail of the IO interface to maintain the power up sequence of the IO interface.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
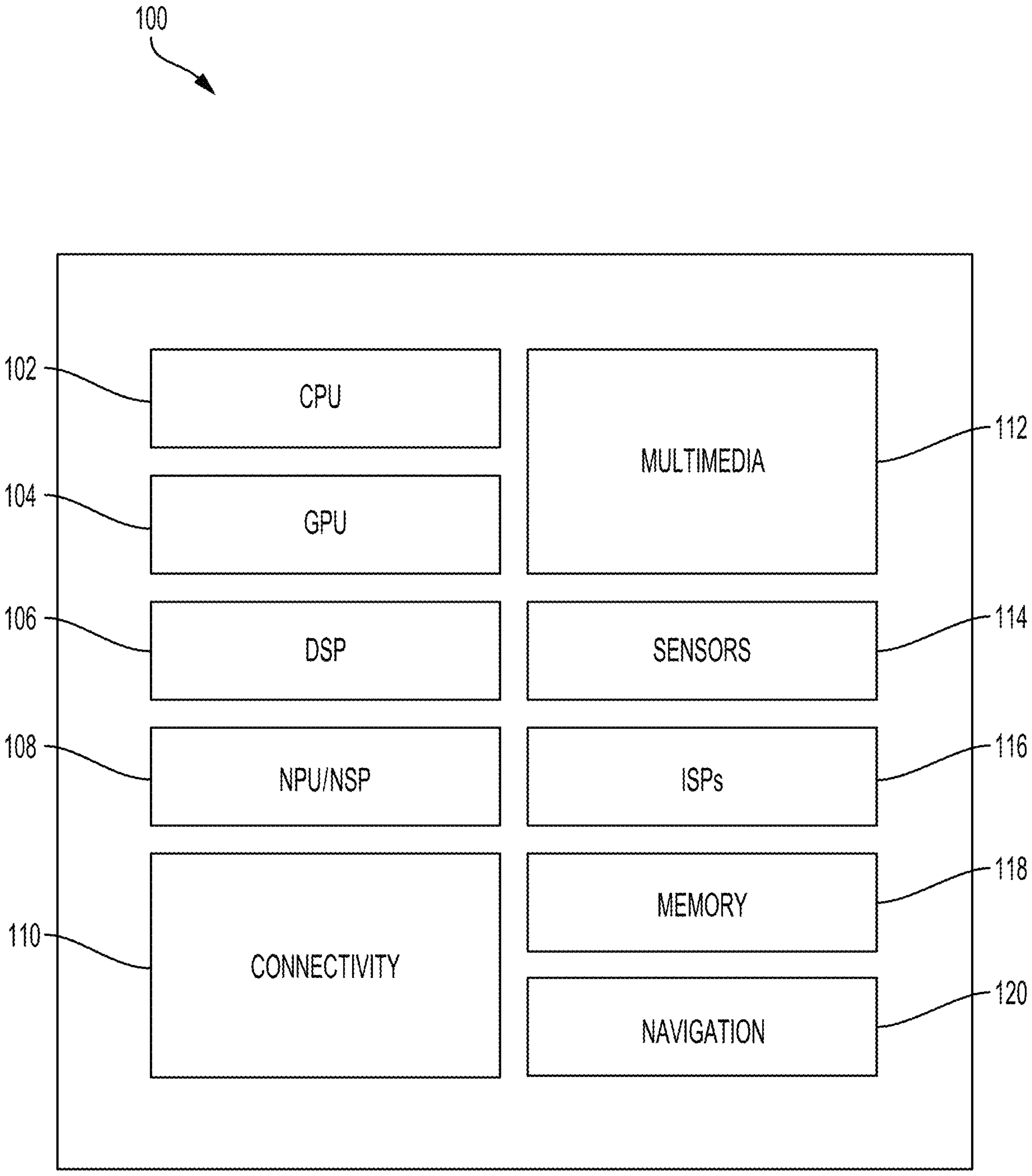
FIG. 1 illustrates an example implementation of a host system-on-chip (SoC), which is configured for a high voltage switch design in a low voltage process node with a small quiescent current, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts.

As described herein, the use of the term "and/or" is intended to represent an "inclusive OR," and the use of the term "or" is intended to represent an "exclusive OR." As described herein, the term “exemplary” used throughout this description means “serving as an example, instance, or illustration,” and should not necessarily be construed as preferred or advantageous over other exemplary configurations. As described herein, the term “coupled” used throughout this description means “connected, whether directly or indirectly through intervening connections (e.g., a switch), electrical, mechanical, or otherwise,” and is not necessarily limited to physical connections. Additionally, the connections can be such that the objects are permanently connected or releasably connected. The connections can be through switches. As described herein, the term “proximate” used throughout this description means “adjacent, very near, next to, or close to.” As described herein, the term “on” used throughout this description means “directly on” in some configurations, and “indirectly on” in other configurations.

Stringent electrical operational specifications help address system redundancy, provide greater resistance to electrical and software faults, and improve system monitoring. One sub-component of such systems that is of interest is a high voltage switch that produces voltages, also commonly referred to as an operating voltage (VOP), to drive various input/output (IO) sub-systems of a system-on-chip (SoC). For example, an SoC may include a high voltage switch implemented using transistor devices configured to operate at a master input voltage (e.g., 3.3 volts (V)).

Currently, process nodes continue a downward size minimization resulting in low voltage process nodes. Unfortunately, transistor devices for implementing a high voltage switch that is configured to operate at a master input voltage (e.g., 3.3 V) are unavailable at low voltage process nodes. For example, an IO sub-system of an SoC utilizes master input voltage rails (e.g., 3.3 V) when implemented at a conventional process node. By contrast, implementation of the IO sub-system at a low voltage process node involves redesigning of the IO sub-system using a cascode structure. In practice, the available transistors at low voltage process nodes fail to withstand application of the master input voltage (e.g., 3.3 V) across a gate-source and/or drain-source of the transistor devices.

Redesigning of the IO sub-system to operate at the low voltage process nodes (e.g., 14 nanometers (nm)) is specified due to the noted lack of transistor devices that can operate with the master input voltage (e.g., 3.3 V). One option for redesigning the IO sub-system is a cascode structure. In the cascode structure, a low voltage rail (usually 1.8 V) is applied first before ramping up the 3.3 V rail according to a specified power up sequence (also referred to as power on sequence) for ensuring reliability of the IO sub-system. Unfortunately, implementation of the cascode structure involves a complex power management integrated circuit (PMIC) to implement the specified power on sequence. Replacing the PMIC in an SoC where the master input supply is 3.3 V, because the input 3.3 V ramps up at the very beginning, creates a need for a switch capable of working with 3.3 V to maintain the specified power on sequence. In particular, a high voltage switch design in a low voltage process node with a small quiescent current is desired.

Various aspects of the present disclosure are directed to a high voltage switch design in a low voltage process node with a small quiescent current, for example, below an activation current level. According to various aspects of the present disclosure, a system-on-chip (SoC) includes an interface physical input/output (IO) module (PHY) on a substrate. In some implementations, the interface PHY includes a high voltage power rail and a low voltage power rail and is configured to follow a power on sequence. The SoC further includes a voltage regulator on the substrate and is configured to supply a low voltage to the low voltage power rail of the interface PHY. The SoC further includes a high voltage switch on the substrate and coupled to the high voltage power rail of the interface PHY and the voltage regulator. In some implementations, the high voltage switch is configured to maintain a quiescent current in the interface PHY at a low level when a high voltage supply is applied to the high voltage switch to maintain a power up sequence of the interface PHY.

FIG. 1 illustrates an example implementation of a system-on-chip (SoC) 100, which is configured for high voltage switch design in a low voltage process node with a small quiescent current, in accordance with various aspects of the present disclosure. The SoC 100 includes processing blocks tailored to specific functions, such as a connectivity block 110. The connectivity block 110 may include sixth generation (6G), connectivity fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 100 includes various processing units that support multi-threaded operation. For the configuration shown in FIG. 1, the SoC 100 includes a multi-core central processing unit (CPU) 102, a graphics processor unit (GPU) 104, a digital signal processor (DSP) 106, and a neural processor unit (NPU)/neural signal processor (NSP) 108. The SoC 100 may also include a sensor processor 114, image signal processors (ISPs) 116, a navigation module 120, which may include a global positioning system, and a memory 118. The multi-core CPU 102, the GPU 104, the DSP 106, the NPU/NSP 108, and the multimedia engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU/NSP 108 may be based on an ARM instruction set.

Currently, process nodes continue a downward size minimization resulting in low voltage process nodes. Unfortunately, transistor devices for implementing a high voltage switch that is configured to operate at a master input voltage (e.g., 3.3 V) are unavailable from the low voltage process nodes. For example, an IO sub-system of the SoC 100 utilizes master input voltage rails (3.3 V) when implemented at a conventional process node. In practice, the available transistors at low voltage process nodes fail to withstand application of the master input voltage (e.g., 3.3 V) across a gate-source and/or drain-source of the transistor devices. Consequently, implementation of the IO sub-system at the low voltage process nodes involves redesigning of the IO sub-system.

Redesigning of the IO sub-system to operate at the low voltage process nodes (e.g., 14 nm) is specified due to the noted lack of transistor devices that can operate with the master input voltage (e.g., 3.3 V). One option for redesigning the IO sub-system is a cascode structure. In the cascode structure, a low voltage rail (usually 1.8 V) is applied first before ramping up the 3.3 V rail according to a specified power up sequence for ensuring reliability of the IO sub-system. Unfortunately, implementation of the cascode structure involves a complex power management integrated circuit (PMIC) to implement the specified power on sequence. Replacing the PMIC, while maintaining the specified power on sequence of the IO sub-system, in which the master input supply is 3.3 V, involves a switch capable of working with 3.3 V because the supplied input voltage ramps up to 3.3 V during the power on sequence. A high voltage switch design compatible with a low voltage process node, while maintaining a small quiescent current, is shown, for example, in FIG. 2.

Figure 2:
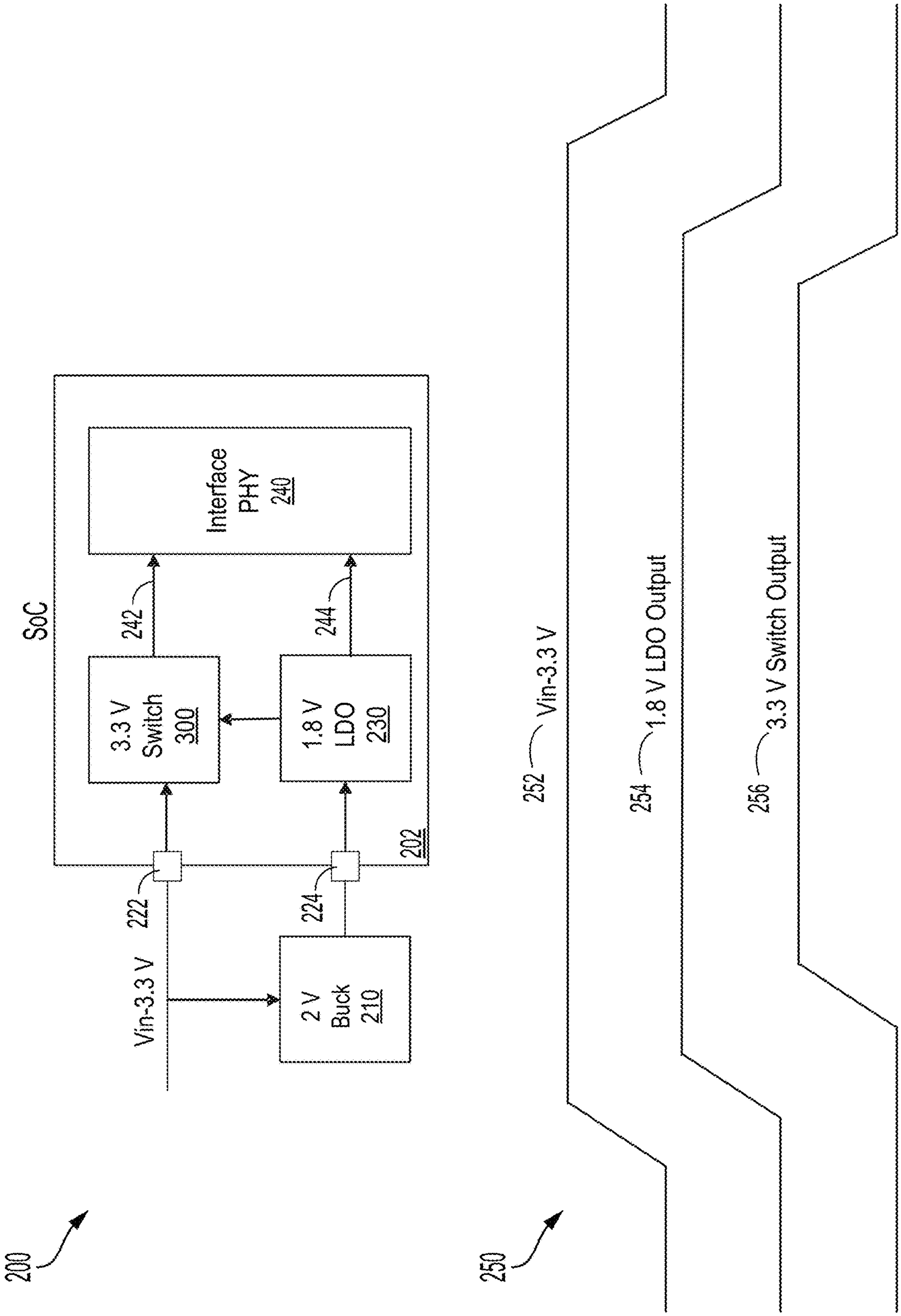
FIG. 2 is a block diagram illustrating an input/output (IO) system-on-chip (SoC) having a high voltage switch design in a low voltage process node with a small quiescent current, in accordance with various aspects of the present disclosure.

FIG. 2 is a block diagram illustrating an input/output (IO) system-on-chip (SoC) 200 having a high voltage switch design in a low voltage process node with a small quiescent current, in accordance with various aspects of the present disclosure. As shown in FIG. 2, the IO SoC 200 includes an interface physical input/output (IO) module (PHY) 240 on a substrate 202. In some implementations, the interface PHY 240 includes a high voltage power rail 242 and a low voltage power rail 244 (e.g., a tri-rail pad) and is configured to follow a power up sequence 250. The IO SoC 200 further includes a voltage regulator 230 (e.g., a low dropout (LDO) voltage regulator) on the substrate 202 and configured to supply a low voltage output 254 (e.g., 1.8 V) to the low voltage power rail 244 of the interface PHY 240.

In various aspects of the present disclosure, the IO SoC 200 further includes a high voltage switch 300 on the substrate 202 that is coupled to the high voltage power rail 242 of the interface PHY 240 and the voltage regulator 230. Additionally, a voltage converter 210 (e.g., a buck converter) is coupled to a second input terminal 224 of the IO SoC 200. In this example, the voltage converter 210 is configured to convert the high supply input voltage (Vin) 252 (e.g., 3.3 V) to a reduced output voltage that is supplied to the voltage regulator 230 as a reduced input voltage to initiate a power up sequence of the interface PHY 240. In some implementations, the high voltage switch 300 is configured to maintain a quiescent current in the interface PHY 240 at a low level when the high supply input voltage 252 is applied to the high voltage switch 300 through a first input terminal 222 of the IO SoC 200 to generate the switch output voltage 256 (e.g., 3.3 V). The high voltage switch 300 may be implemented, for example, as shown in FIG. 3.

Figure 3:
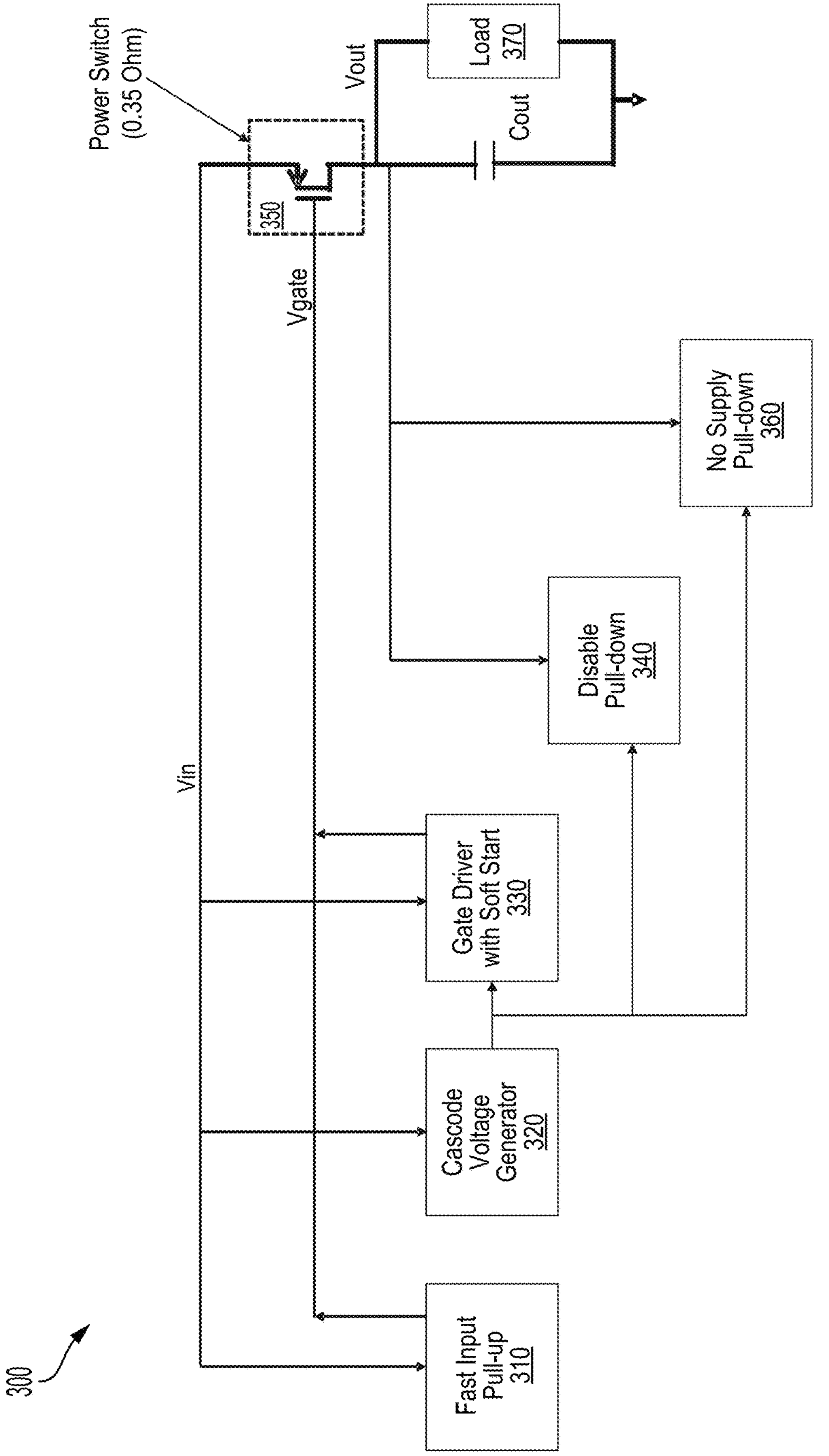
FIG. 3 is a block diagram illustrating a high voltage switch design in a low voltage process node with a small quiescent current, and further illustrates the high voltage switch of FIG. 2, in accordance with various aspects of the present disclosure.

FIG. 3 is a block diagram illustrating a high voltage switch design in a low voltage process node with a small quiescent current, in accordance with various aspects of the present disclosure. FIG. 3 further illustrates the high voltage switch 300 of FIG. 2, according to various aspects of the present disclosure.

As shown in FIG. 3, the high voltage switch 300 includes a fast input pull-up block 310 to receive an input voltage (Vin). In this implementation, the fast input pull-up block 310 protects an output voltage (Vout) of a power switch 350 of the high voltage switch 300 from overshooting. For example, as overshoot of the output voltage Vout may occur in response to a fast input voltage Vin ramp up (e.g., <200 μsec). The fast input pull-up block 310 maintains the power switch 350 in an off state during a fast input voltage ramp up. In some implementations, the power switch 350 is implemented with a P-type metal oxide semiconductor (PMOS), with a source terminal configured to receive Vin and a gate configured to receive Vgate. The drain of the PMOS is configured to output Vout.

The high voltage switch 300 further includes a cascode voltage (Vcasc) generator block 320. In this implementation, the Vcasc generator block 320 receives the input voltage Vin and is configured to provide over-voltage protection for the power switch 350 of the high voltage switch 300. In practice, transistor devices (e.g., N-type metal oxide semiconductor (NMOS) or P-type metal oxide semiconductor (PMOS)) that can operate with a master input voltage (e.g., 3.3 V) across a drain and source are not available in a small process node (e.g., 14 nm fin field effect transistor (FinFET) (14 nmFF)). As a result, the Vcasc generator block 320 is configured to clamp the voltage to a lower value to ensure the reliability of the P-type transistor and N-type transistor devices used in various sub-blocks in FIG. 3.

Additionally, the high voltage switch 300 includes a gate driver 330 configured to provide a soft start of the power switch 350 of the high voltage switch 300. As shown in FIG. 3, the gate driver 330 is configured to turn on and off the power switch 350 of the high voltage switch 300 according to a gate voltage (Vgate). In this example, the gate driver 330 is implemented with a soft start mechanism, in which the soft start mechanism limits the in-rush current that charges an output capacitor (Cout) in parallel with a load 370. Additionally, the soft start mechanism lowers the ramp rate at which the output voltage Vout rises.

The high voltage switch 300 further includes a disable pull-down block 340. During operation of the high voltage switch 300, when the power switch 350 is off, leakage from the high voltage switch 300 can pull the output voltage Vout close to input voltage Vin especially at high temperatures if the load current is small. In this implementation, the disable pull-down block 340 is turned on when the power switch 350 is kept off and ensures that the drain-to-source voltage of the power switch 350 does not exceed a reliability limit (e.g., 2.75 V).

Various aspects of the present disclosure specify that the power switch 350 remain off when the control supply (e.g., 1.8 V) is not available. The control supply is usually derived from the input voltage Vin and, as such, the control supply is available when the input voltage Vin is fully ramped up. If the control supply is zero, all the control signals are zero and, as a result, the output voltage Vout can rise close to the input voltage Vin due to the switch leakage at elevated temperatures with a smaller load. In this implementation, a no supply pull-down block 360 is configured to prevent the output voltage Vout from rising close to the input voltage Vin by drawing current from an output voltage Vout node. A circuit implementation of the high voltage switch 300 is further illustrated, for example, in FIG. 4.

Figure 4:
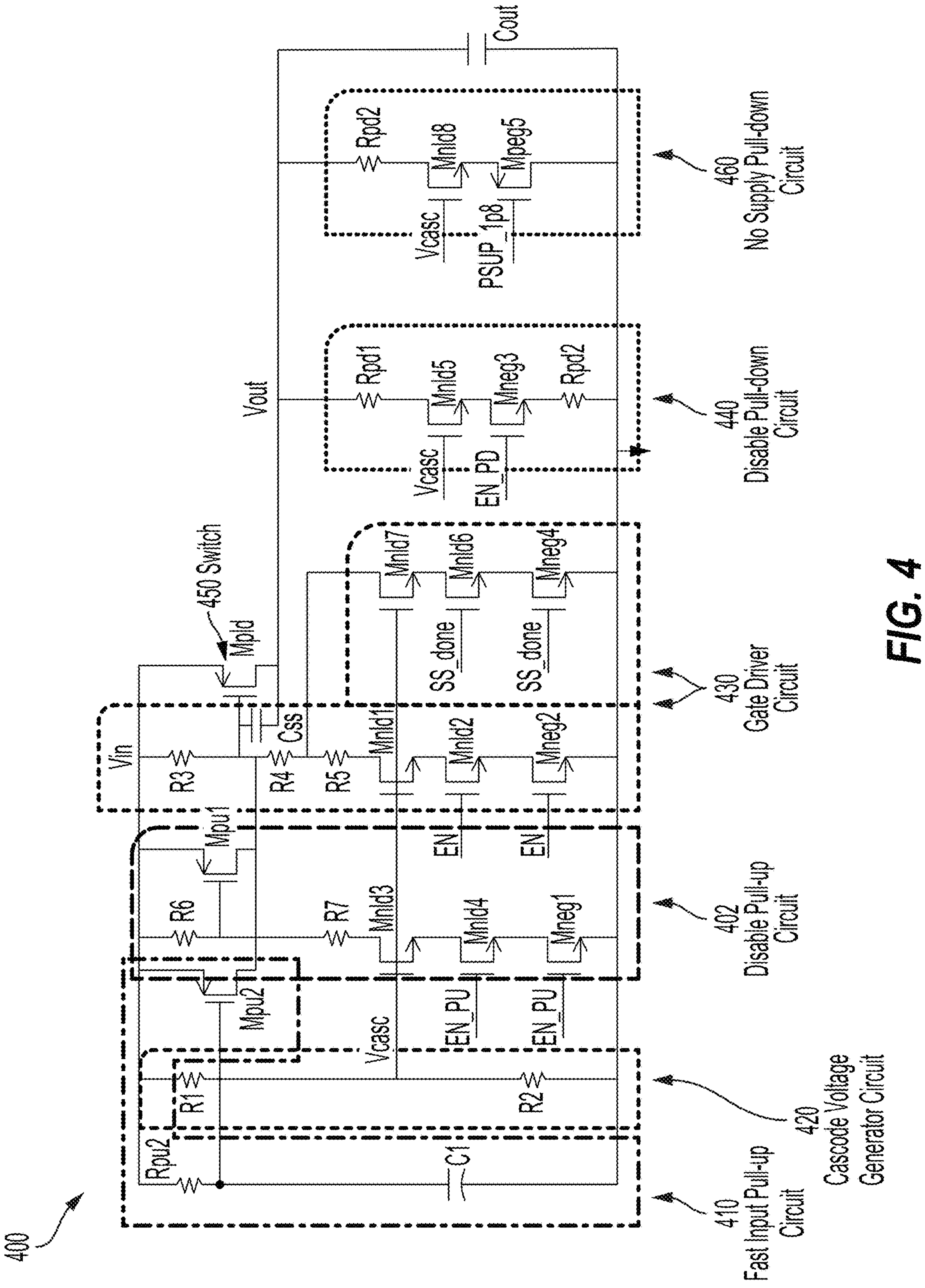
FIG. 4 is a circuit diagram illustrating a high voltage switch design in a low voltage process node with a small quiescent current, in accordance with various aspects of the present disclosure.

FIG. 4 is a circuit diagram illustrating a high voltage switch design in a low voltage process node with a small quiescent current, in accordance with various aspects of the present disclosure. FIG. 4 further illustrates the high voltage switch 300 of FIG. 3, according to various aspects of the present disclosure.

As shown in FIG. 4, a high voltage switch 400 includes a fast input pull-up circuit 410 configured as a low-pass filer (LPF) having a resistance-capacitance (RC) time constant based on a capacitor (C1) and a resistor (Rpu2) coupled to a pull-up transistor (Mpu2). In this implementation, the fast input pull-up circuit 410 protects an output voltage (Vout) of an Mpld power switch 450 (e.g., P-type laterally-diffused MOS (LDMOS) device) of the high voltage switch 400 from overshooting. For example, an overshoot of the output voltage Vout may occur in response to a fast ramp up (e.g., <200 μsec) of the input voltage Vin. The fast input pull-up circuit 410 maintains the Mpld power switch 450 in an off state during a fast input voltage ramp up.

For example, when the input voltage Vin rises, the Mpld power switch 450 is disabled and, as such, the output voltage Vout is significantly reduced (e.g., close to 0 V). Nevertheless, if the input voltage Vin rises too quickly, due to a large pull-up resistor (R3), which maintains a small quiescent current and a large source-to-gate capacitance (Csg) of the Mpld power switch 450, the gate node of the Mpld power switch 450 cannot follow the input voltage Vin. In this scenario, the Mpld power switch 450 turns on briefly and causes the output voltage Vout to rise.

According to various aspects of the present disclosure, the low-pass filter Rpu2-C1 supplied by the fast input pull-up circuit 410 enables the pull-up transistor Mpu2 when the input voltage Vin rises too quickly. In this example, enabling the pull-up transistor Mpu2 reduces the impedance across the source and gate of the Mpld power switch 450. Because of this impedance reduction, the gate of the Mpld power switch 450 can follow the input voltage Vin and a source-to-gate voltage (Vsg) of the Mpld power switch 450 remains at approximately zero volts, which maintains the Mpld power switch 450 in an off state.

The high voltage switch 400 further includes a cascode voltage (Vcasc) generator circuit 420. In this implementation, the Vcasc generator circuit 420 receives the input voltage Vin and is configured to provide over-voltage protection for the high voltage switch 400. In this example, the Vcasc generator circuit 420 includes a first resistor (R1) and a second resistor (R2), arranged as an R1-R2 resistor divider to supply the over-voltage protection for the high voltage switch 400. In practice, the gate node, and the drain node of the Mpld power switch 450 can be as large as the input voltage Vin (e.g., 3.3 V+/−5%) and any active control circuitry under this node is specified to withstand the input voltage Vin.

In practice, transistor devices (e.g., N-type metal oxide semiconductor (NMOS) or P-type metal oxide semiconductor (PMOS)) that can operate with a master input voltage (e.g., 3.3 V) across a drain and source are not available in small process nodes (e.g., 14 nm fin field effect transistor (FinFET) (14 nmFF) process nodes). As a result, multiple NMOS devices (e.g., Mnld3, Mnld4 and Mneg1) are used in series, and the Vcasc generator circuit 420 clamps the voltage to a lower value. Utilizing the Vcasc generator circuit 420 to clamp the voltage to a lower value ensures the reliability of the cascaded NMOS devices (e.g., Mnld3, Mnld4 and Mneg1), which form a portion of a disable pull-up circuit 402. In this implementation, the capacitance at the Vcasc node is kept low to provide over-voltage protection by ensuring the Vcasc voltage can follow the input voltage Vin. In this implementation, Mnld refers to an N-type LDMOS device that can withstand, for example, 2.75V across the drain and source. Additionally, Mneg refers to an N-type MOS device that can withstand, for example, 1.98V across the drain and source.

As shown in FIG. 4, the high voltage switch 400 further includes the disable pull-up circuit 402. In various aspects of the present disclosure, the disable pull-up circuit 402 utilizes a strong pull-up transistor Mpu1 to maintain the Mpld power switch 450 in an off state. Utilization of the strong pull-up transistor Mpu1 is implemented at the cost of a small quiescent current (e.g., ~1 microamp (uA)). An R6-R7 resistor divider is turned on when the Mpld power switch 450 is disabled using an enable pull-up (EN_PU) control signal and, thus, the pull-up transistor Mpu1 (e.g., a pull-up device) is enabled to provide a low impedance path for the gate node of the Mpld power switch 450 to quickly charge to the input voltage Vin.

In this example, the R6-R7 resistor divider ensures that a source-to-gate voltage (Vsg) of the pull-up transistor Mpu1 does not exceed a reliability limit of the pull-up transistor Mpu1 (e.g., Vsg is limited to 1.98 V). Although the pull-up resistor R3 pulls up the gate voltage of the Mpld power switch 450 close to the input voltage Vin and keeps the Mpld power switch 450 off during a disabled state, a turn-off transient for the Mpld power switch 450 is extremely slow due to the large value of the pull-up resistor R3 (Mohm) and large source-to-gate capacitance (Csg) and a gate-to-drain capacitance (Cgd) of the Mpld power switch 450 (e.g., Csg+Cgd capacitance is in the range of tens (10 s) of picofarads (pFs) (10 s of pFs).

Additionally, the high voltage switch 400 includes a gate driver circuit 430 configured to provide a soft start of the Mpld power switch 450. As shown in FIG. 4, the gate driver circuit 430 is configured to turn on and off the Mpld power switch 450 of the high voltage switch 400. In this example, the gate driver circuit 430 is implemented with a soft start mechanism, in which the soft start mechanism limits the in-rush current that charges an output capacitor Cout in parallel with a load 370 (as shown in FIG. 3). Additionally, the soft start mechanism lowers the ramp rate at which the output voltage Vout rises.

In this implementation, the gate driver circuit 430 is configured as a resistor divider (e.g., a pull-up resistor R3/a first pull-down resistor R4/a second pull-down resistor R5) based driver because a variation of the input voltage Vin is minimal (+/−3%) for the intended applications. An enable signal (EN) is initially asserted to first cascaded transistors Mnld1, Mnld2 and Mneg2, which enables the Mpld power switch 450. When the Mpld power switch 450 is enabled, the voltage at the gate (e.g., Vin*R3/(R3+R4+R5)) is a fraction of the full drive voltage and, as such, the Mpld power switch 450 turns on with a lower drive strength.

Additionally, a soft start capacitor (Css) along with gate-to-drain capacitance Cgd of the Mpld power switch 450 slows down the discharge rate of the gate of the Mpld power switch 450 due to an RC time constant (e.g., R4+R5, Css, and Cgd). As a result, the output capacitance Cout is slowly charged with a smaller current and a lower voltage ramp rate, which ensures a smaller in-rush current. After the output voltage Vout is sufficiently charged, a soft start (SS) completed (SS_done) signal is asserted to second cascaded transistors Mnld7, Mnld6 and Mneg4, which shorts the R5 resistor. In response to shorting the R5 resistor, the voltage at the gate Vg of the Mpld power switch 450 reaches a predetermined voltage level (e.g., Vin*R3/(R3+R4)) and turns on the Mpld power switch 450 with full drive strength. In this example, the on-resistance of the Mnld1, Mnld2, Mnld6, Mnld7, Mneg2 and Mneg4 transistors are significantly smaller than R3 and R4 to ensure the accuracy of the division ratio.

The high voltage switch 400 further includes a disable pull-down circuit 440. In this implementation, the Mpld power switch 450 is designed as a large switch (e.g., 100 mA with 0.6 ohm of on-resistance). During operation of the Mpld power switch 450, when the Mpld power switch 450 is off, leakage from the Mpld power switch 450 can pull the output voltage Vout close to the input voltage Vin. This problem of pulling the output voltage Vout close to the input voltage Vin is exacerbated at high temperatures, especially if the load current is small.

In this implementation, the disable pull-down circuit 440 is turned on when the Mpld power switch 450 is kept off and ensures that the Vout does not exceed a reliability limit (2.75 V). In this example, the disable pull-down circuit 440 includes a pull-down resistor Rpd1, a first transistor Mnld5, a second transistor Mneg3, and a source degeneration resistor Rpd2, which are coupled in series and operate in response to an enable pull-down (EN_PD) signal that is activated when the Mpld power switch 450 is in an off state. The first pull-down resistor Rpd1, the transistor Mnld5, the transistor Mneg3, and the source degeneration resistor Rpd2 are sized appropriately so that the current drawn by the branch of the disable pull-down circuit 440 is larger than the leakage current of the Mpld power switch 450. In this example, the source degeneration resistor Rpd2 provides a voltage drop that ensures the drain-to-source voltage Vds of the transistor Mnld5 does not exceed a reliability limit (e.g., 2.75 V).

Various aspects of the present disclosure specify that the Mpld power switch 450 remains off when the control supply (e.g., 1.8 V) is not available. The control supply is usually derived from the input voltage Vin and, as such, the control supply is available when the input voltage Vin is fully ramped up. If the control supply is zero, all the control signals, including the EN_PD signal, are zero, and, as a result, the output voltage Vout can rise close to the input voltage Vin due to the leakage of the Mpld power switch 450 during elevated temperatures when under a smaller load.

In this implementation, a no-supply pull-down circuit 460 is configured to prevent the output voltage Vout from rising close to the input voltage Vin by drawing current from the Vout node (e.g., an output voltage node) to a ground node. In the no-supply pull-down circuit 460, an Mpeg5 PMOS transistor is turned on when a PSUP_1p8 (e.g., 1.8V control supply) signal is less than a threshold voltage Vth of the Mpeg5 PMOS transistor. In this example, a branch of the no-supply pull-down circuit 460 includes a pull-down resistor Rpd2, a transistor Mnld2, and a transistor Mpeg5, to draw current from the output voltage Vout node. When the PSUP_1*p*8 signal is greater than the threshold voltage Vth (e.g., PSUP_1p8>Vth), the Mpeg5 PMOS transistor turns off, and the current path no longer exists.

Figure 5:
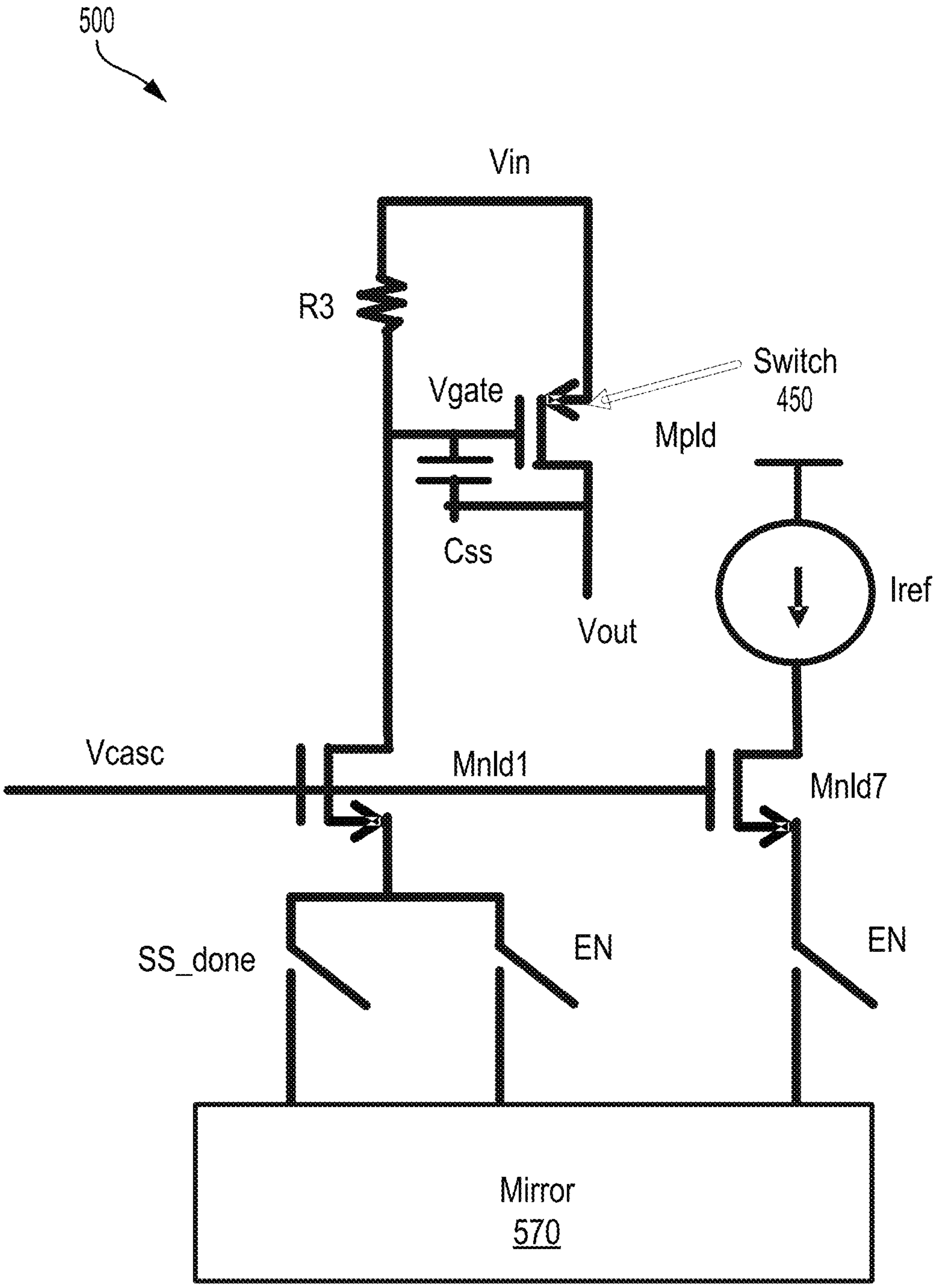
FIG. 5 is a circuit diagram illustrating a high voltage switch design in a low voltage process node with a small quiescent current, in accordance with various aspects of the present disclosure.

FIG. 5 is a circuit diagram illustrating a high voltage switch design in a low voltage process node with a small quiescent current, in accordance with various aspects of the present disclosure. FIG. 5 further illustrates the high voltage switch 300 of FIG. 3, according to various aspects of the present disclosure.

As shown in FIG. 5, a high voltage switch 500 is shown according to an alternative implementation of the high voltage switch 400 of FIG. 4, in which similar elements are described with similar references. In this example, the Mpld power switch 450 of FIG. 4 is shown with reference to the pull-up resistor R3, the input voltage Vin, the soft start capacitor Css, and the output voltage Vout. Additionally, the Mnld1 and Mnld7 transistors are shown having a gate node coupled to the cascode voltage Vcasc node. This implementation of the high voltage switch 500 utilizes a reference current source (Iref) as well as a current mirror 570.

During operation of the high voltage switch 500, when the enable (EN) signal is de-asserted (e.g., EN='0'), the pull-up resistor R3 shorts the gate and source of the Mpld power switch 450, which maintains the Mpld power switch 450 in an on state. When the EN signal is asserted (e.g., EN='1'), a small current flows into the pull-up resistor R3, which slowly turns on the Mpld power switch 450 according to a soft start process. When a soft start (SS) complete signal (SS_done) is asserted (e.g., SS_done='1'), additional current flows into the pull-up resistor R3 and turns on the Mpld power switch 450 with a full drive strength. This implementation of the high voltage switch 500 involves a bandgap due to the current source Iref. A process for maintaining a power up sequence of a high voltage power switch may be performed, for example, as shown in FIG. 6.

Figure 6:
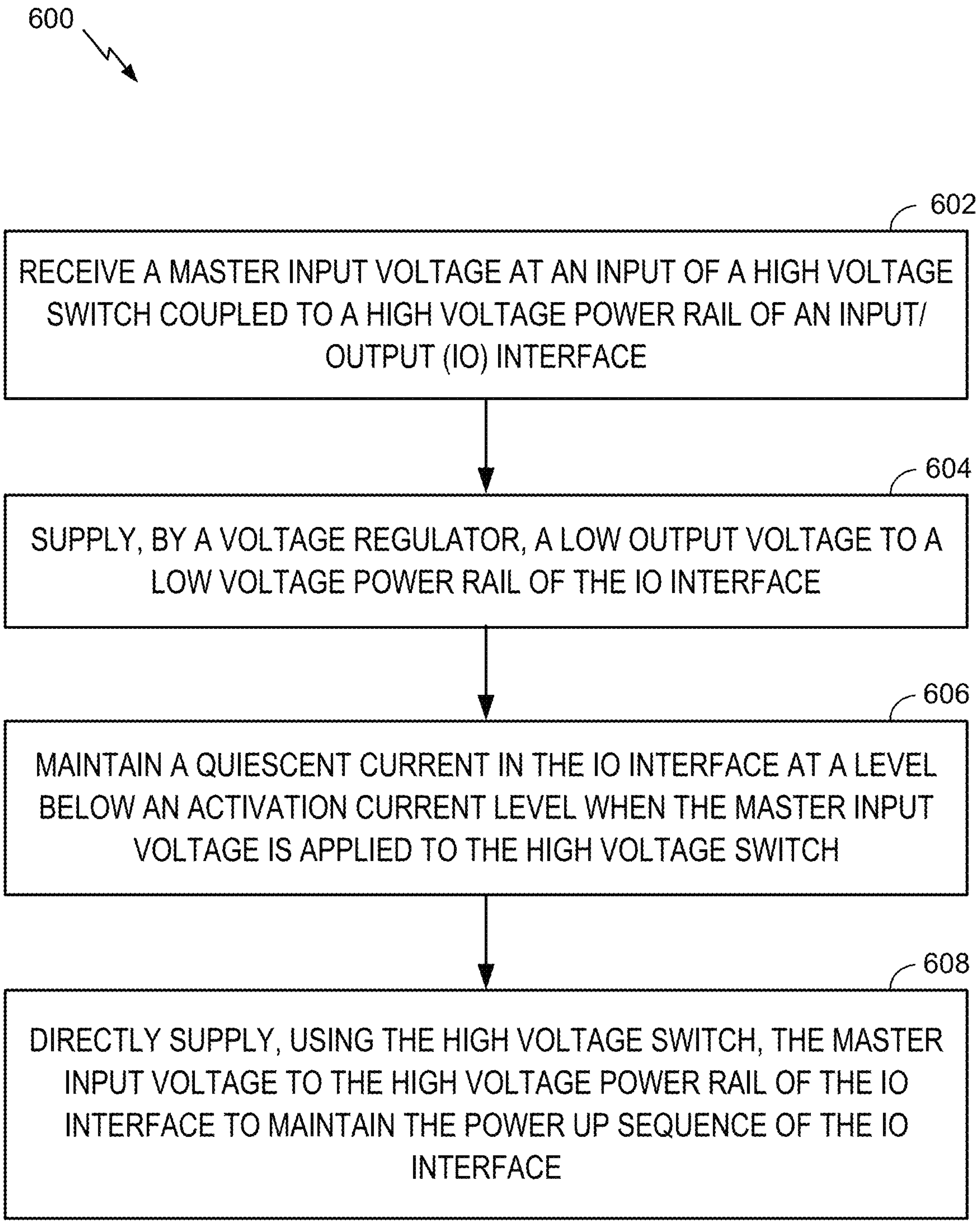
FIG. 6 is a process flow diagram illustrating a method to ensure a power up sequence, according to various aspects of the present disclosure.

FIG. 6 is a process flow diagram illustrating a method 600 to ensure a power up sequence, according to various aspects of the present disclosure. The method 600 begins at block 602, in which a master input voltage is received at an input of a high voltage switch coupled to a high voltage power rail of an input/output (IO) interface. For example, as shown in FIG. 2, the high supply input voltage 252 is applied to the high voltage switch 300 through a first input terminal 222 of the IO SoC 200.

At block 604, a voltage regulator supplies a low output voltage to a low voltage power rail of the IO interface. For example, as shown in FIG. 2, The IO SoC 200 further includes a voltage regulator 230 (e.g., a low dropout (LDO) voltage regulator) on the substrate 202 and configured to supply a low voltage output 254 (e.g., 1.8 V) to the low voltage power rail 244 of the interface PHY 240.

At block 606, a quiescent current in the IO interface is maintained at a level below an activation current level when the master input voltage is applied to the high voltage switch. For example, as shown in FIG. 2, the high voltage switch 300 is configured to maintain a quiescent current in the interface PHY 240 at a low level when the high supply input voltage 252 is applied to the high voltage switch 300 through a first input terminal 222 of the IO SoC 200 to generate the switch output voltage 256 (e.g., 3.3 V).

At block 608, the high voltage switch directly supplies the master input voltage to the high voltage power rail of the IO interface to maintain the power up sequence of the IO interface. For example, as shown in FIG. 2, the IO SoC 200 further includes a high voltage switch 300 on the substrate 202 that is coupled to the high voltage power rail 242 of the interface PHY 240 and the voltage regulator 230. Additionally, a voltage converter 210 (e.g., a buck converter) is coupled to a second input terminal 224 of the IO SoC 200. In this example, the voltage converter 210 is configured to convert the high supply input voltage (Vin) 252 (e.g., 3.3 V) to a reduced output voltage that is supplied to the voltage regulator 230 as a reduced input voltage to initiate a power up sequence of the interface PHY 240 to generate the switch output voltage 256 (e.g., 3.3 V).

Figure 7:
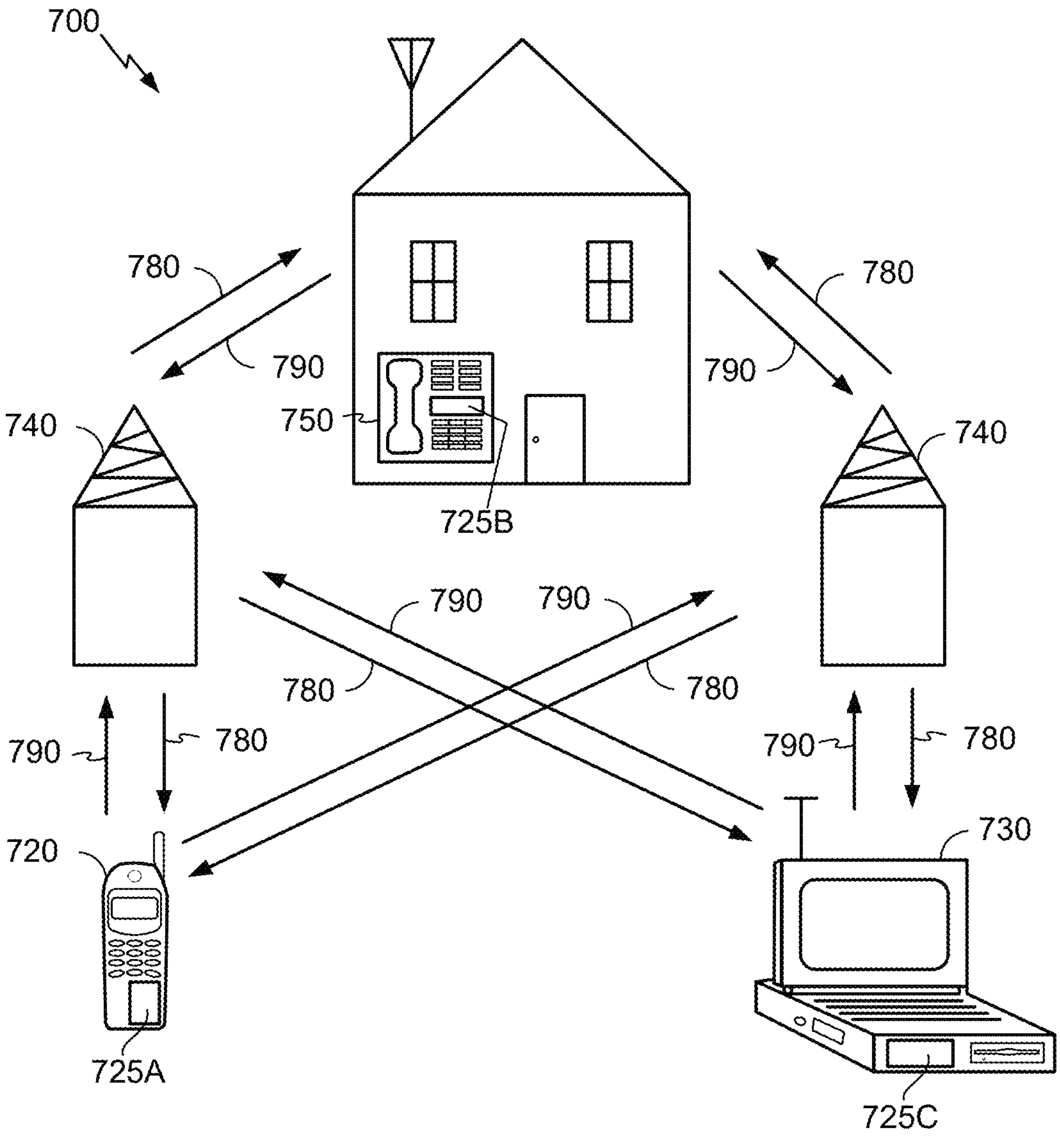
FIG. 7 is a block diagram showing an exemplary wireless communications system in which a configuration of the disclosure may be advantageously employed.

FIG. 7 is a block diagram showing an exemplary wireless communications system 700 in which an aspect of the present disclosure may be advantageously employed. For purposes of illustration, FIG. 7 shows three remote units 720, 730, and 750 and two base stations 740. It will be recognized that wireless communications systems may have many more remote units and base stations. Remote units 720, 730, and 750 include integrated circuit (IC) devices 725A, 725C, and 725B that include the disclosed high voltage power switch. It will be recognized that other devices may also include the high voltage power switch, such as the base stations 740, switching devices, and network equipment. FIG. 7 shows forward link signals 780 from the base stations 740 to the remote units 720, 730, and 750, and reverse link signals 790 from the remote units 720, 730, and 750 to the base stations 740.

In FIG. 7, remote unit 720 is shown as a mobile telephone, remote unit 730 is shown as a portable computer, and remote unit 750 is shown as a fixed location remote unit in a high voltage power switch system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a communications device, personal digital assistant (PDA), a fixed location data unit, such as meter reading equipment, or other device that stores or retrieves data or computer instructions, or combinations thereof. Although FIG. 7 illustrates remote units according to the aspects of the present disclosure, the present disclosure is not limited to these exemplary illustrated units. Aspects of the present disclosure may be suitably employed in many devices, which include the disclosed high voltage power switch.

Figure 8:
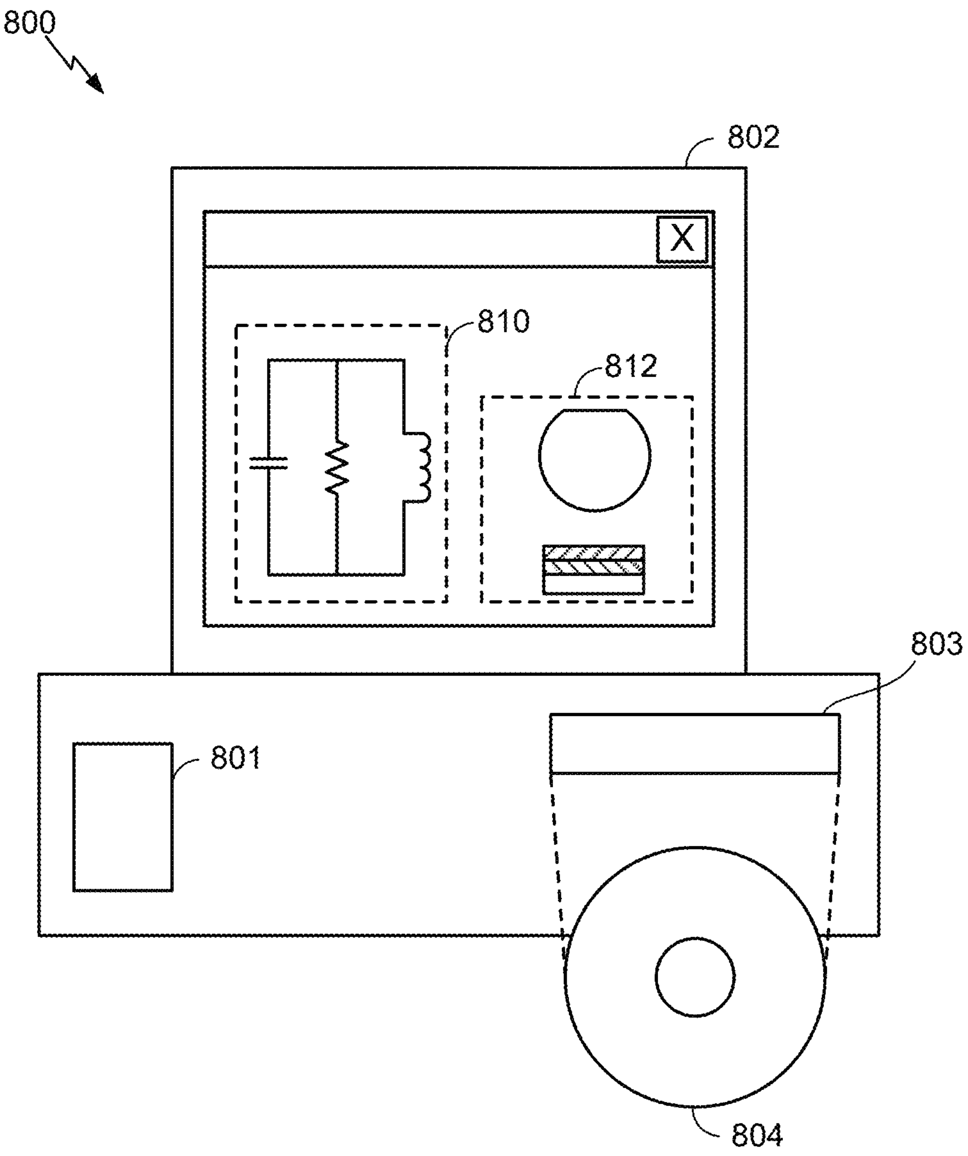
FIG. 8 is a block diagram illustrating a design workstation used for circuit, layout, and logic design of a semiconductor component according to one configuration.

FIG. 8 is a block diagram illustrating a design workstation used for circuit, layout, and logic design of a semiconductor component, such as the high voltage power switch disclosed above. A design workstation 800 includes a hard disk 801 containing operating system software, support files, and design software such as Cadence or OrCAD. The design workstation 800 also includes a display 802 to facilitate design of a circuit 810, such as a high voltage power switch. A storage medium 804 is provided for tangibly storing the design of the circuit 810 (e.g., the high voltage power switch). The design of the circuit 810 or the high voltage power switch 812 may be stored on the storage medium 804 in a file format such as GDSII or GERBER. The storage medium 804 may be a compact disc read-only memory (CD-ROM), digital versatile disc (DVD), hard disk, flash memory, or another appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit 810 or the high voltage power switch 812 by decreasing the number of processes for designing semiconductor wafers.

Implementation examples are described in the following numbered clauses:

1. A system-on-chip (SoC) comprising:
   an interface physical input/output (IO) module (PHY) on a substrate, the interface PHY having a high voltage power rail and a low voltage power rail;
   a voltage regulator on the substrate and configured to supply to a low voltage to the low voltage power rail; and
   a high voltage switch on the substrate and coupled to the high voltage power rail of the interface PHY and the voltage regulator, the high voltage switch to maintain a quiescent current in the interface PHY below an activation current level.
2. The SoC of clause 1, further comprising:
   a voltage converter having an output coupled to the voltage regulator and to convert a master input voltage to a reduced output voltage to supply the reduced output voltage to the voltage regulator.
3. The SoC of any of clauses 1 or 2, in which the voltage regulator comprises a low dropout (LDO) voltage regulator coupled to the low voltage power rail of the interface PHY.
4. The SoC of any of clauses 1-3, further comprising a gate driver circuit coupled to a gate and a source of the high voltage switch, the gate driver circuit comprising:
   a resistor divider including a pull-up resistor coupled between the source and the gate of the high voltage switch and a first pull-down resistor and a second pull-down resistor, the first pull-down resistor coupled between the pull-up resistor and the second pull-down resistor; and
   first cascaded transistors coupled to the second pull-down resistor.
5. The SoC of clause 4, in which an enable signal is coupled to the first cascaded transistors to turn on the high voltage switch with a lower drive strength based on the resistor divider.
6. The SoC of clause 4, in which the gate driver circuit further comprises:
   a soft start capacitor (Css) coupled between the gate and a drain of the high voltage switch; and
   second cascaded transistors coupled to the Css.
7. The SoC of clause 6, in which a soft start (SS) completed (SS_done) signal is coupled to the second cascaded transistors to short the second pull-down resistor and turn on the high voltage switch to a full drive strength in response to the SS_done signal.
8. The SoC of any of clauses 1-7, further comprising a fast input pull-up circuit comprising a low-pass filter to dynamically maintain the high voltage switch in an off state in response to a ramp up of a master input voltage.
9. The SoC of any of clauses 1-8, further comprising:
   a disable pull-down circuit, comprising a pull-down resistor, a first transistor, a second transistor, and a source degeneration resistor, coupled in series; and
   an enable pull-down (EN_PD) signal coupled to the first transistor and/or the second transistor to provide a low impedance path for a gate node of the high voltage switch to maintain the high voltage switch in an off state.
10. The SoC of any of clauses 1-9, further comprising:
    a no-supply pull-down circuit comprising an N-type transistor, a P-type transistor, and a pull-down resistor coupled in series between an output voltage node and a ground node; and
    a control supply coupled to the P-type transistor to turn-off the P-type transistor and disable a current path between the output voltage node and the ground node.
11. A method to perform a power up sequence, the method comprising:
    receiving a master input voltage at an input of a high voltage switch coupled to a high voltage power rail of an input/output (IO) interface;
    supplying, by a voltage regulator, a low output voltage to a low voltage power rail of the IO interface;
    maintaining a quiescent current in the IO interface at a level below an activation current level when the master input voltage is applied to the high voltage switch; and
    directly supplying, using the high voltage switch, the master input voltage to the high voltage power rail of the IO interface to maintain the power up sequence of the IO interface.
12. The method of clause 11, in which receiving further comprises:
    converting, using a voltage converter, the master input voltage to a reduced output voltage; and
    supplying the reduced output voltage to the voltage regulator.
13. The method of any of clauses 11 or 12, in which supplying comprises:
    receiving a reduced input voltage converted from the master input voltage; and
    regulating, by a low dropout (LDO) voltage regulator, the low output voltage supplied to the low voltage power rail of the IO interface.
14. The method of any of clauses 11-13, in which maintaining the quiescent current comprises:

shorting, in response to an enable signal, a gate and a source of the high voltage switch; and initiating a soft start of the high voltage switch.

15. The method of clause 14, further comprising turning on the high voltage switch to a full drive strength in response to a soft start (SS) completed (SS_done) signal.

16. The method of any of clauses 11-15, in which receiving the master input voltage comprises dynamically maintaining the high voltage switch in an off state in response to a ramp up of the master input voltage.

17. The method of any of clauses 11-16, in which maintaining the quiescent current comprises dynamically lowering a ramp rate of an output voltage of the high voltage switch.

18. The method of any of clauses 11-17, in which maintaining the quiescent current comprises:

asserting an enable pull-up (EN_PU) signal to activate a pull-up device; and providing, by the pull-up device, a low impedance path for a gate node of the high voltage switch to maintain the high voltage switch in an off state.

19. The method of any of clauses 11-18, in which the IO interface comprises an interface physical input/output (IO) module (PHY) coupled to the high voltage switch and the voltage regulator.

20. The method of clause 19, in which the interface PHY is integrated in a system-on-chip (SoC).

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present application is not intended to be limited to the configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function, or achieve substantially the same result as the corresponding configurations described herein, may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in random access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

The previous description of the present disclosure is provided to enable any person skilled in the art to make or use the disclosure. Various modifications to the present disclosure will be readily apparent to those skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein.

What is claimed:

1. A system-on-chip (SoC) comprising:

an interface physical input/output (IO) module (PHY) on a substrate, the interface PHY having a high voltage power rail and a low voltage power rail;

a voltage regulator on the substrate and configured to supply to a low voltage to the low voltage power rail;

a high voltage switch on the substrate and coupled to the high voltage power rail of the interface PHY and the voltage regulator, the high voltage switch configured to maintain a quiescent current in the interface PHY below an activation current level; and a gate driver circuit coupled to a gate and a source of the high voltage switch, the gate driver circuit comprising:

a resistor divider including a pull-up resistor coupled between the source and the gate of the high voltage switch, a first pull-down resistor and a second pull-down resistor, the first pull-down resistor coupled between the pull-up resistor and the second pull-down resistor; and first cascaded transistors coupled to the second pull-down resistor.

2. The SoC of claim 1, further comprising a voltage converter having an output coupled to the voltage regulator and to convert a master input voltage to a reduced output voltage to supply the reduced output voltage to the voltage regulator.

3. The SoC of claim 1, in which the voltage regulator comprises a low dropout (LDO) voltage regulator coupled to the low voltage power rail of the interface PHY.

4. The SoC of claim 1, in which an enable signal is coupled to the first cascaded transistors to turn on the high voltage switch with a lower drive strength based on the resistor divider.

5. The SoC of claim 1, in which the gate driver circuit further comprises:

a soft start capacitor (Css) coupled between the gate and a drain of the high voltage switch; and second cascaded transistors coupled to the Css.

6. The SoC of claim 5, in which a soft start (SS) completed (SS_done) signal is coupled to the second cascaded transistors to short the second pull-down resistor and turn on the high voltage switch to a full drive strength in response to the SS_done signal.

7. The SoC of claim 1, further comprising a fast input pull-up circuit comprising a low-pass filter to dynamically maintain the high voltage switch in an off state in response to a ramp up of a master input voltage.

8. A system-on-chip (SoC) comprising:

an interface physical input/output (IO) module (PHY) on a substrate, the interface PHY having a high voltage power rail and a low voltage power rail;

a voltage regulator on the substrate and configured to supply to a low voltage to the low voltage power rail; and a high voltage switch on the substrate and coupled to the high voltage power rail of the interface PHY and the voltage regulator, the high voltage switch configured to maintain a quiescent current in the interface PHY below an activation current level;

a disable pull-down circuit, comprising a pull-down resistor, a first transistor, a second transistor, and a source degeneration resistor, coupled in series; and an enable pull-down (EN_PD) signal coupled to the first transistor and/or the second transistor to provide a low impedance path for a gate node of the high voltage switch to maintain the high voltage switch in an off state.

9. A system-on-chip (SoC) comprising:

an interface physical input/output (IO) module (PHY) on a substrate, the interface PHY having a high voltage power rail and a low voltage power rail;

a voltage regulator on the substrate and configured to supply to a low voltage to the low voltage power rail; and a high voltage switch on the substrate and coupled to the high voltage power rail of the interface PHY and the voltage regulator, the high voltage switch configured to maintain a quiescent current in the interface PHY below an activation current level;

a no-supply pull-down circuit comprising an N-type transistor, a P-type transistor, and a pull-down resistor coupled in series between an output voltage node and a ground node; and a control supply coupled to the P-type transistor to turn-off the P-type transistor and disable a current path between the output voltage node and the ground node.

10. A method to perform a power up sequence, the method comprising:

receiving a master input voltage at an input of a high voltage switch coupled to a high voltage power rail of an input/output (IO) interface;

supplying, by a voltage regulator, a low output voltage to a low voltage power rail of the IO interface;

maintaining a quiescent current in the IO interface at a level below an activation current level when the master input voltage is applied to the high voltage switch by:

shorting, in response to an enable signal, a gate and a source of the high voltage switch; and initiating a soft start of the high voltage switch; and directly supplying, using the high voltage switch, the master input voltage to the high voltage power rail of the IO interface to maintain the power up sequence of the IO interface.

11. The method of claim 10, in which receiving further comprises:

converting, using a voltage converter, the master input voltage to a reduced output voltage; and supplying the reduced output voltage to the voltage regulator.

12. The method of claim 10, in which supplying comprises:

receiving a reduced input voltage converted from the master input voltage; and regulating, by a low dropout (LDO) voltage regulator, the low output voltage supplied to the low voltage power rail of the IO interface.

13. The method of claim 10, further comprising turning on the high voltage switch to a full drive strength in response to a soft start (SS) completed (SS_done) signal.

14. The method of claim 10, in which receiving the master input voltage comprises dynamically maintaining the high voltage switch in an off state in response to a ramp up of the master input voltage.

15. The method of claim 10, in which maintaining the quiescent current comprises dynamically lowering a ramp rate of an output voltage of the high voltage switch.

16. The method of claim 10, in which the IO interface comprises an interface physical input/output (IO) module (PHY) coupled to the high voltage switch and the voltage regulator.

17. The method of claim 16, in which the interface PHY is integrated in a system-on-chip (SoC).

18. A method to perform a power up sequence, the method comprising:

receiving a master input voltage at an input of a high voltage switch coupled to a high voltage power rail of an input/output (IO) interface;

supplying, by a voltage regulator, a low output voltage to a low voltage power rail of the IO interface;

maintaining a quiescent current in the IO interface at a level below an activation current level when the master input voltage is applied to the high voltage switch by:

asserting an enable pull-up (EN_PU) signal to activate a pull-up device; and providing, by the pull-up device, a low impedance path for a gate node of the high voltage switch to maintain the high voltage switch in an off state; and directly supplying, using the high voltage switch, the master input voltage to the high voltage power rail of the IO interface to maintain the power up sequence of the IO interface.

* * * * *